(12) United States Patent
Yoshida et al.

(10) Patent No.: US 7,681,915 B2
(45) Date of Patent: Mar. 23, 2010

(54) PARTITIONING METHOD FOR PIPE MATERIAL, PIPE MATERIAL MANUFACTURED BY THE METHOD, AND GAS GENERATOR

(75) Inventors: Masahiro Yoshida, Himeji (JP); Takeo Sukeyasu, Kanzaki-gun (JP)

(73) Assignees: Nippon Kayaku Kabushiki Kaisha, Tokyo (JP); Sunrise Industry Co., Ltd., Kanzaki-gun (JP)

( * ) Notice: Subject to any disclaimer, the term of this patent is extended or adjusted under 35 U.S.C. 154(b) by 566 days.

(21) Appl. No.: 10/584,206

(22) PCT Filed: Dec. 22, 2004

(86) PCT No.: PCT/JP2004/019185

§ 371 (c)(1),
(2), (4) Date: Jun. 23, 2006

(87) PCT Pub. No.: WO2005/065861

PCT Pub. Date: Jul. 21, 2005

(65) Prior Publication Data

US 2007/0144394 A1 Jun. 28, 2007

(30) Foreign Application Priority Data

Dec. 24, 2003 (JP) .............................. 2003-427219

(51) Int. Cl.
*B60R 21/26* (2006.01)

(52) U.S. Cl. ..................................................... 280/741

(58) Field of Classification Search ................. 280/736, 280/741; 102/430, 431; 72/367.1, 368, 370.19
See application file for complete search history.

(56) References Cited

U.S. PATENT DOCUMENTS 6,464,254 B2 * 10/2002 Chikaraishi et al. ......... 280/741

| | | | |
|---|---|---|---|
| 6,547,277 B1 | 4/2003 | Adamini et al. | |
| 2002/0000716 A1 | 1/2002 | Chikaraishi et al. | |

FOREIGN PATENT DOCUMENTS

| CN | 1325803 A | 12/2001 |
|---|---|---|
| DE | 8 716 060 U | 4/1989 |
| DE | 199 48 425 A1 | 11/2000 |
| EP | 0 857 626 A2 | 8/1998 |
| FR | 1 219 258 | 5/1960 |
| JP | 10 324219 | 12/1998 |
| JP | 2001 212632 | 8/2001 |
| JP | 2002 12125 | 1/2002 |
| JP | 2002-362299 | 12/2002 |
| WO | 01 74633 | 10/2001 |

* cited by examiner

*Primary Examiner*—Faye M. Fleming
(74) *Attorney, Agent, or Firm*—Oblon, Spivak, McClelland, Maier & Neustadt, L.L.P.

(57) ABSTRACT

A tube partitioning method that can manufacture an airtight tube with a reduced number of processes and thus a reduced manufacturing cost, and a gas generator using the tube. The tube partitioning method includes first and second processes partitioning or closing a hollow portion of a tube made of metal at a predetermined location using a partitioning plate, and a gas generator uses the tube. In the first process, the partitioning plate is inserted in the tube, with its surfaces oriented substantially vertically with respect to a longitudinal direction of the tube. In the second process, the partitioning plate is disposed at a predetermined location in the tube and the tube is crimped from its peripheral face at locations adjacent to the predetermined location, whereby the partitioning plate is bitten 0.1 mm or more into a wall of the tube from a peripheral edge face thereof to bring the tube and the partitioning plate into contact with each other.

10 Claims, 7 Drawing Sheets
(1 of 7 Drawing Sheet(s) Filed in Color)

Detail of J

FIG. 7

PARTITIONING METHOD FOR PIPE MATERIAL, PIPE MATERIAL MANUFACTURED BY THE METHOD, AND GAS GENERATOR

TECHNICAL FIELD

The present invention relates to a tube partitioning method for partitioning a metal tube along a longitudinal direction thereof without impairing its air-tightness, to a tube produced by the same method, and to a gas generator. More particularly, the present invention related to a tube partitioning method that can provide improved air-tightness at high pressure while providing a reduced number of processes, to a tube partitioned by the same method, and to a gas generator.

BACKGROUND ART

Previously proposed partitioning methods for partitioning a metal tube into two or more airtight regions along a longitudinal direction thereof, or partitioning an end portion of a tube that opens at least at one end thereof, include the crimping process that after a partitioning plate is inserted in the tube until a predetermined location along the longitudinal direction thereof, the tube is formed to be airtight by the crimping process. The crimping process has the advantage that no property change of the tube occurs with heat as is accompanied by the welding process, but has the disadvantage of being inferior in air-tightness. To eliminate this disadvantage, prior art proposes, in general, an attempt solution that an O-ring is fitted around an outer edge of the partitioning plate to improve air-tightness of the tube (Cf. Patent Document 1, for example). However, this method described by Patent Document 1 involves the step of indenting the outer edge of the partitioning plate to receive the O-ring, in addition to the steps of inserting the partitioning plate in the tube and fixing it in the tube by the crimping process, thus causing cost increase.

Further, prior art proposes an alternative attempt to provide improved air-tightness by the crimping process, according to which after a partitioning plate of steel product which is a representative example of metals is fixed in the tube of the steel product through the use of the shrinking effect of the tube produced by the crimping process, the tube is strikingly pressed against the partitioning plate from a surfacewise direction of the partitioning plate, to produce indentation extending along a peripheral edge of the partitioning place (Cf. Patent Document 2, for example).

This method described by Patent Document 2 can provide improved air-tightness by the crimping process, but involves the step of strikingly pressing the tube against the partitioning plate from the surfacewise direction of the partitioning plate, in addition to the steps of fitting the partitioning plate in the tube and fixing it in the tube by the crimping process, thus still suffering from cost increase.

Also, as is known from Patent Document 3, prior art proposes another alternative attempt that the coining process is taken to produce a sealing relationship between the tube and the partitioning plate. However, this method provides an increased number of processes by the extent corresponding to the coining process, thus causing cost increase.

Patent Document 1: Pamphlet of International Publication No. WO01/74633;

Patent Document 2: JP Laid-open (Unexamined) Publication No. 2001-212632; and

Patent Document 3: JP Laid-open (Unexamined) Publication No. 2002-12125.

DISCLOSURE OF THE INVENTION

Problems to be Solved by the Invention

In the light of the problems mentioned above, the present invention has been made. It is an object of the present invention to provide a tube partitioning method that can manufacture an airtight tube with a reduced number of processes and thus a reduced manufacturing cost, and a gas generator using the same tube.

Means for Solving the Problem

The present invention provides a tube partitioning method for partitioning or closing a hollow portion of a tube made of metal at a predetermined location using a partitioning plate, the method comprising the first process of inserting the partitioning plate in the tube, with its surface oriented substantially vertically with respect to a longitudinal direction of the tube, and the second process of disposing the partitioning plate at a predetermined location in the tube and crimping the tube from its peripheral face at locations adjacent to the predetermined location where the partitioning plate is disposed so that the partitioning plate can be bitten 0.1 mm or more into an inside wall of the tube from a peripheral edge face thereof to bring the tube and the partitioning plate into contact with each other.

Also, the present invention provides a tube made of metal and having a partitioning plate which is disposed in a predetermined location in a hollow portion of the tube, to partition or close the hollow portion of the tube, wherein the tube has crimped portions formed in a peripheral face of the tube at locations adjacent to the location where the partitioning plate is disposed, to fix the partitioning plate in the tube, and the partitioning plate is bitten in a wall of the tube 0.1 mm or more inwardly from its periphery edge face.

Further, the present invention provides a gas generator for an airbag having a cylindrical tube made of metal including a combustion chamber packed with gas generant which is burnt to generate high pressure gas, a filter chamber in which a filter material is fitted, a partitioning plate, made of metal which is different from that of the tube in at least one of properties of hardness, thickness, and stretch, for partitioning the tube into the combustion chamber and the filter chamber, and an igniter, fitted at an end portion of the tube, for igniting and burning the gas generant in the combustion chamber, wherein in order to fix the portioning plate in the tube, the tube has a crimped portion formed on its peripheral face at locations adjacent to a location where the partitioning plate is disposed and the partitioning plate is bitten 0.1 mm or more into a wall of the tube from a peripheral edge face thereof.

Effect of the Invention

According to the tube partitioning method and the tube formed by the same method, the partitioning plate is bitten 0.1 mm or more into the wall of the tube from a peripheral edge face thereof. This can produce the probable result that the shrinking effect of the tube produced by the crimping process and the plastic deformation of at least one of the tube and the partitioning plate at a contact portion therebetween produced by the crimping process are fully cooperated in a synergistic manner, so that no substantial gap is formed between the partitioning plate and the inside face of the tube. This can produce an improved airtight tube.

In addition, since this result can be produced by the crimping process only, there is no need of the seal member, such as an O-ring, differently from the prior art. Further, there is no need to take the process of fitting the seal member such as the O-ring and the process of pressing the tube against the partitioning plate strikingly from the surfacewise direction of the partitioning plate. This can provide the result that the improved airtight tube can be provided with a decreased number of processes and also can provide reduction in cost of the tube.

According to the gas generator, the partitioning plate is bitten 0.1 mm or more into the wall of the tube from a peripheral edge face thereof. This can produce the probable result that the shrinking effect of the tube produced by the crimping process and the plastically depressed deformation of the contact portion between the partitioning plate and the inside face of the tube produced by the crimping process are fully cooperated in a synergistic manner, so that no substantial gap is formed between the inside face of the tube and the partitioning plate. This can produce an improved airtight tube.

In addition, since this result can be produced by the crimping process only, there is no need of the seal member, such as the O-ring, differently from the prior art. Further, there is no need to take the process of fitting the seal member such as the O-ring and the process of pressing the tube against the partitioning plate strikingly from the surfacewise direction of the partitioning plate. This can provide the results that the airtight cylindrical tube can be provided with a decreased number of components and a decreased number of producing processes. This can also provide reduction in cost, accordingly. Thus, the gas generator which has good air-tightness at high pressure and can be manufactured at low costs can be provided.

BEST MODE FOR CARRYING OUT THE INVENTION

Figure 1A:
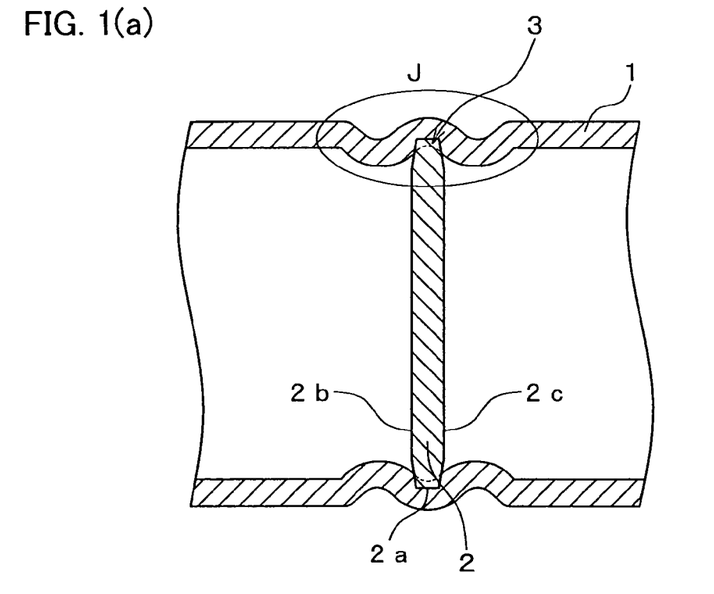
FIG. 1(a) is a longitudinal sectional view of a general-purpose airtight tube according to the present invention.
Figure 1B:
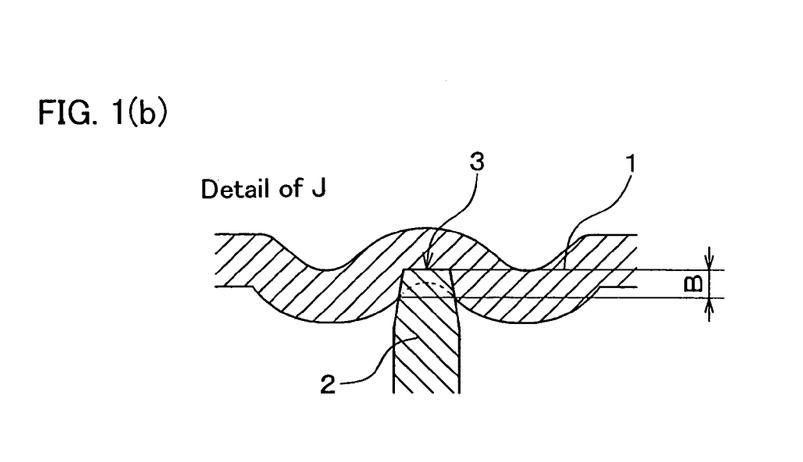
FIG. 1(b) is an enlarged view of the longitudinal sectional view of the tube shown in FIG. 1(a)

In the following, a tube according to the present invention will be explained with reference to FIG. 1[(a),(b)] (hereinafter it is simply referred to as FIG. 1). FIG. 1 is a longitudinal sectional view of a general-purpose airtight tube according to the present invention. As shown in FIG. 1, a partitioning plate 2 having an outer diameter substantially equal to an inner diameter of a tube 1 is fitted in the tube 1, with its surface being substantially normal to a longitudinal direction of the tube 1. In order to fix the partitioning plate 2 in the tube 1, the tube 1 is crimped at locations across the partitioning plate 2 so that it can be crimped onto the partitioning plate 2 at the locations adjacent to a predetermined location where the partitioning plate 2 is disposed. It is preferable that the locations at which the tube is crimped are spaced from each other at an interval in the range of 5-10 mm. The tube 1 is plastically deformed in a depressed manner so that its inside face is brought into close contact with the partitioning plate 2 at its peripheral edge face 2a and at its front and back sides 2b, 2c orthogonal to the peripheral edge face 2a and adjacent thereto in the thickness direction. This can produce the probable result that the shrinking effect of the tube 1 produced by the crimping and the plastic deformation at its contact portion with the partitioning plate 2 produced by the crimping are fully cooperated in a synergistic manner, so that no substantial gap is formed between the partitioning plate and the inside face of the tube. This can produce an improved airtight tube 1. Various factors including hardness, thickness, and stretch of both the tube 1 and the portioning plate 2 are combined to produce the result that the tube 1 and the partitioning plate 2 are brought into close contact with each other via the depressed portion 3 thus formed in the inside face of the tube 1. The shape of the tube 1 depicted by a dashed line in FIG. 1 is the one formed when the inside face of the tube 1 is not plastically deformed in a depressed manner. The thickness of the tube 1 is preferably in the range of 1.5-2.3 mm. The tube 1 and the partitioning plate 2 are usually made of stainless steel, iron, and the like. Reference letter B in FIG. 1(b) indicates a depth of bite of the partitioning plate 2 into the tube 1. This depth of bite can be measured, after the tube 1 is cut at the crimped part to be exposed, by observing the crimped part thus exposed with a magnifying microscope available from Keyence Corporation. Usually, the portioning plate 2 bites into the tube 1 0.1 mm or more. A cold-finished seamless steel pipe having a tensile strength of 585-715 N/mm$^2$, a yield point of 540-670 N/mm$^2$, and a stretch of 18-26% is used for the tube 1, and SUS304 is used for the partitioning plate 2.

Figure 2:
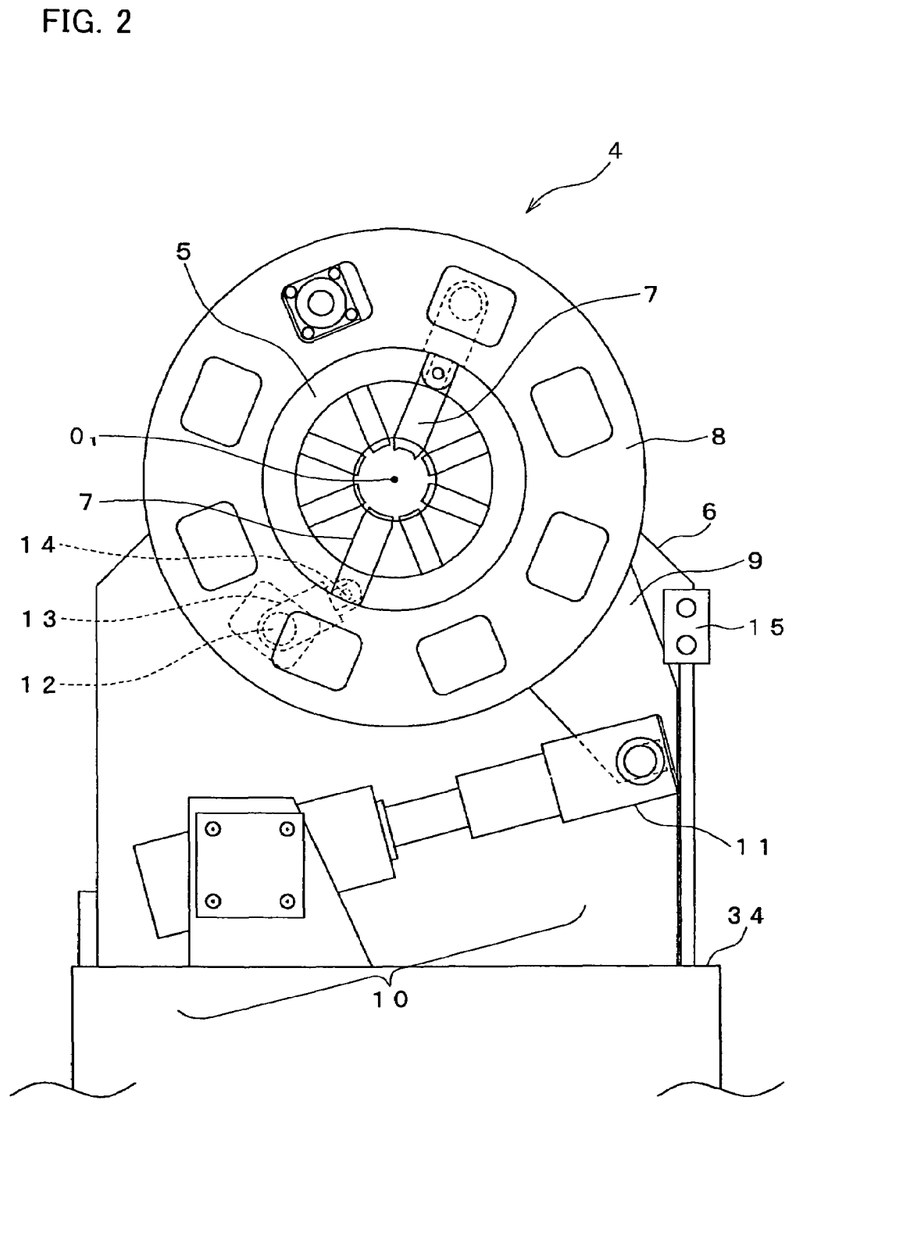
FIG. 2 is a view of a toggle type crimping apparatus for crimping the tube of the present invention as viewed from a direction in which the tube 1 is set in the crimping apparatus in a cross direction with respect to a plane of paper.

Next, a partitioning method for partitioning the tube 1 is explained. A crimping apparatus 4 shown in FIG. 2 is a toggle type of crimping apparatus 4. FIG. 4 is a view of the same crimping apparatus when viewed from a direction in which the tube 1 is set in a cross direction with respect to a plane of paper. The crimping apparatus has a claw holding portion 5 in cylindrical form fixedly mounted on a mounting base 6 fixed to a base 34. The claw holding portion 5 has openings, not shown, formed in a circumference face thereof, for holding claws 7, each for one claw 7. Eight openings, each for holding the single claw 7, are arranged in line in circumferentially equally spaced relation. The claws 7 are held in their respective openings of the claw holding portion 5 in cylindrical form in such a relation as to be movable back and forth with respect to an axis $O_1$. The tube 1 is inserted in a space defined among the claws 7 in a cross direction with respect to a plane of paper. A cylindrical main body 8 having a diameter larger than the claw holding portion 5 is arranged to surround the fixed claw holding portion 5. The main body 8 is mounted on the claw holding portion 5 to be slidably movable along its outside surface. The arm 9 composed with the main body 8 is fixed to the tip hardware 11 of the hydraulic cylinder 10. Hardware 13 is fixed to the main body 8 via fixing pins 12 and also are connected with the claws 7 via connecting pins 14, so that the hardware 13 are pivoted slidably on the outside surface of the fixing pins 12 and on the outside surface of the connecting pins 14.

Figure 3:
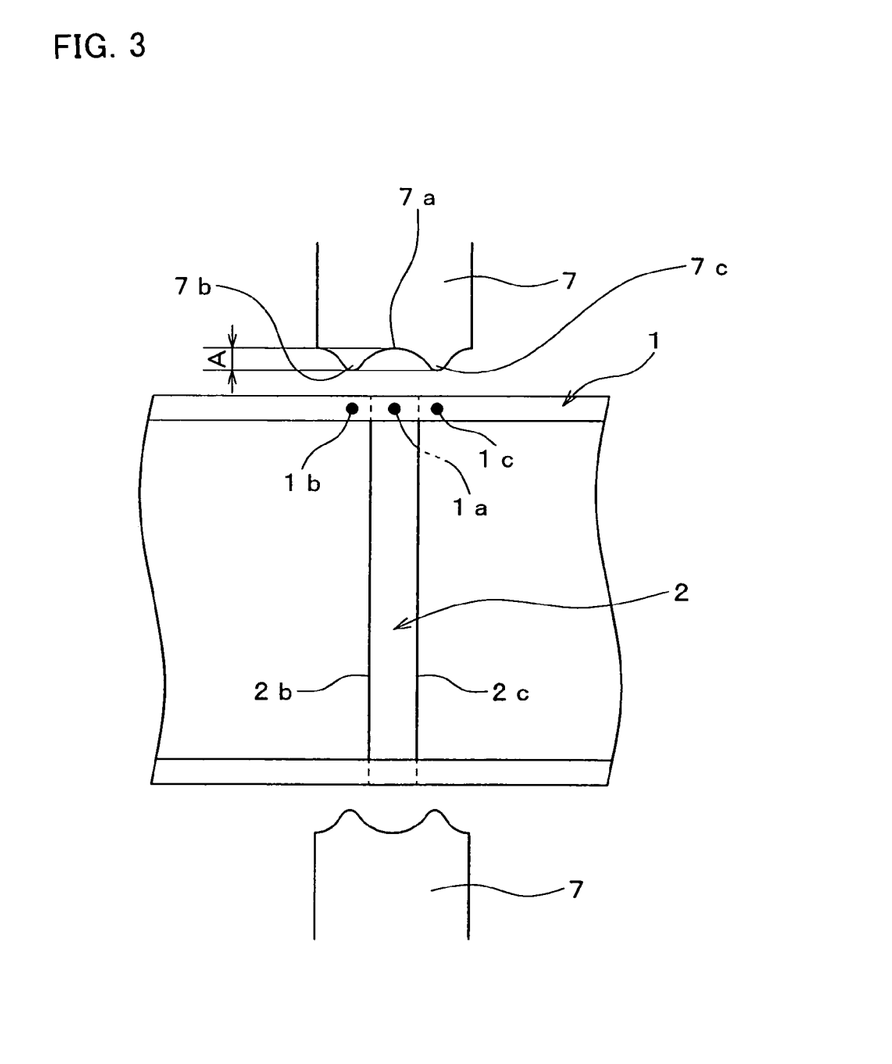
FIG. 3 is a view showing the state that the tube is crimped from an outside surface thereof by claws of the crimping apparatus of FIG. 2.

The shape of the claw 7 is explained with reference to FIG. 3. FIG. 3 is a view showing the state that the tube 1 is crimped from an outside surface thereof by the claws 7. As shown in FIG. 3, the each claw 7 has an indentation 7a, and first and second projections 7b, 7c. The first and second projections 7b, 7c are crimping projections for crimping the tube 1 from outside thereof at locations adjacent to a predetermined location 1a in which the partitioning plate 2 is disposed. The indentation 7a operates to crimp the hollow tube 1 at the locations across the partitioning plate 2. The deformation of the tube 1 by the crimping process is determined by a depth A (e.g. approximately 1.9 mm) of the indentation 7a, a distance for the entire claw 7 to be moved back and forth with respect to the outside surface of the tube 1, a crimping force, and so on. Although the embodiment wherein the tube is crimped at the locations across the partitioning plate 2 has been illustrated above, this is not limited to the case where the tube is crimped at those locations, the partitioning plate is not subjected to any stress. This means that the crimping force may be generated by the indentation 7a as well.

Next, operation of the crimping apparatus 4 is explained with reference to FIG. 2. When a switch 15 is switched on, a hydraulic cylinder 10 changes from its contracted state to its expanded state, to drive the main body 8 to rotate counterclockwise around a centerline or an axis $O_1$ via hardware 11 and an arm 9. A fixing pin 12 fixed to the main body 8 is also rotated counterclockwise about the axis $O_1$ serving as a pivot. Also, the hardware 13 is pivoted slidably on the outside surface of the fixing pins 12 and on the outside surface of the connecting pins 14, and it is rotated counterclockwise about the fixing pin 12 serving as a pivot. Consequently, the each claw 7 is pushed out toward the axis $O_1$ by the hardware 13, to crimp the tube 1.

In the illustrated embodiment, when the tube 1 is crimped using this crimping apparatus 4, the tube 1 is inserted in the space defined among the claws 7 in such a relation that a longitudinal dimension of the tube 1 extends in the cross direction with respect to the plane of paper, first. Then, the partitioning plate 2 in disk form having an outer diameter substantially equal to an inner diameter of a tube 1 is fitted in the tube 1, with its surface being substantially normal to the longitudinal direction of the tube 1. Thereafter, the tube 1 is crimped from outside thereof at locations across the portioning plate 2 and adjacent to the location where the partitioning plate 2 is disposed by the force of e.g. 80 kN or more. In this crimping process, since the tube 1 is plastically deformed in such a depressed manner that its inside face is brought into close contact with a thicknesswise surface of the partitioning plate 2 and front and back sides thereof adjacent to the thicknesswise surface, the airtight tube 1 can be produced with a decreased number of processes. The partitioning plate 2 is in the form of a disk, which may have holes or no holes.

Figure 4A:
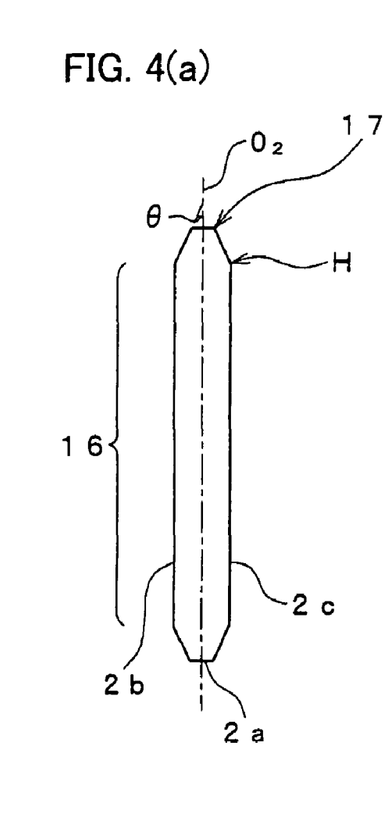
FIG. 4 shows sectional views of a partitioning plate as viewed from a thickness direction thereof.
Figure 4B:
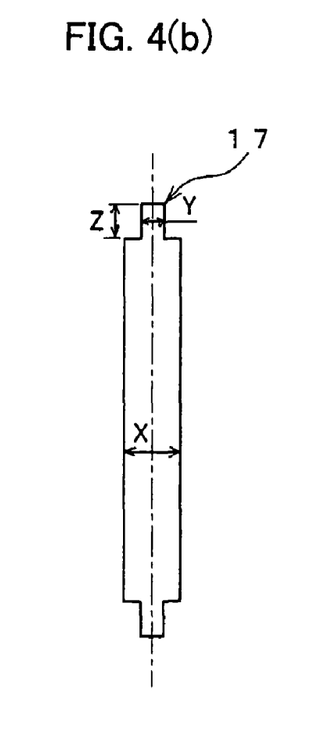
Figure 4C:
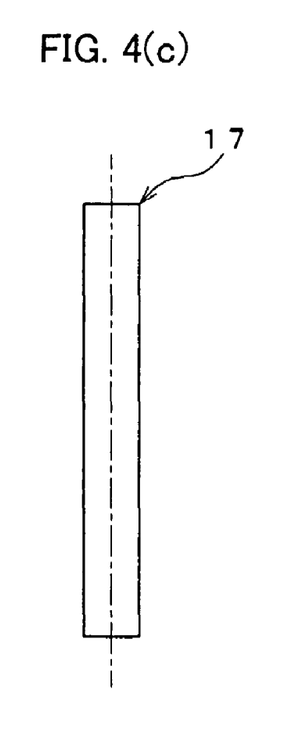

FIG. 4 shows sectional views of the partitioning plate 2 as viewed from the thickness direction thereof. The partitioning plate 2 is in the disk-like form when viewed from a surfacewise direction of the partitioning plate 2. As shown in FIG. 4(a), the partitioning plate 2 has end portions which are in tapered form that reduces in thickness from predetermined positions H of the front and back sides 2b, 2c of the partitioning plate 2 intersecting with the peripheral edge face 2a toward the peripheral edge face 2a and is of symmetrical about a centerline or axis $O_2$ of the sectional view of the same when viewed from the thickness direction. An angle θ of the tapered end portion in section of the partitioning plate 2 to the axis $O_2$ is approximately 30° when viewed from the thickness direction. Also, a portion of the partitioning plate 2 on the inner diameter side from the predetermined positions H (this portion is hereinafter referred to as "the main body portion 16 of the partitioning plate") has a generally uniform thickness. The thickness of the main body portion 16 of the partitioning plate 2 is approximately 3 mm and the thickness of the peripheral edge face 2a of the same is approximately 1-2 mm. No particular limitation is imposed on the thickness of the main body portion 16 of the partitioning plate 2, as long as it has a thickness enough to prevent buckling when force is applied in the crimping process. For example, the thickness of the main body portion 16 is 2 mm or more, or preferably in the order of 2-5 mm. For facilitating the plastically depressed deformation of the inside face of the tube 1, it is preferable that the peripheral edge face 2a of the portioning plate 2 has a smaller thickness. Usually, the thickness of the peripheral edge face 2a is 2.5 mm or less, or preferably in the order of 0.5-2.5 mm. Thus, it is preferable to use the partitioning plate 2 having the tapered end portion whose angle θ is in the range of 10-60°. The tapered end portion may be in the stepped form. The configuration of the end portions of the partitioning plate 2 is not limited to the tapered form. The end portions of the partitioning plate 2 may be formed in a shouldered form by cutting out the end portions from both sides, as shown in FIG. 4(b). In this alternative configuration, it is preferable that thickness Y of the cutout portions of the portioning plate is smaller than thickness X of the peripheral edge face of the same. This is because when a force is applied in the crimping process, the stress is concentrated on the cutout portions so that the shouldered portions of the partitioning plate may be fractured or cracked. In FIG. 4(b), it is preferable that an insertion depth Z of the cutout portions to be inserted in the tube 1 is 0.15 mm or more. It is preferable that the insertion depth Z is related with the thickness Y of the cutout portions and the thickness X of the peripheral edge faces of the partitioning plate to satisfy $X \geq Z \geq (X-Y)/2$. As another alternative to this, the partitioning plate 2 may have a uniform thickness, as shown in FIG. 4(c). In this variant, it is preferable that the portioning plate 2 has hardness higher than the tube 1. It is preferable that the peripheral edge face of the partitioning plate 2 is not rounded at corners 17 thereof, if at all possible, in order to facilitate the plastically depressed deformation of the inside face of the tube 1 in the crimping process. In the variant of FIG. 4(c), it is preferable that the thickness of the partitioning plate 2 is 2.5 mm or less, and the depth of bite of the partitioning plate 2 into the tube 1 is 0.1 mm or more, though it may vary depending on the hardness of the partitioning plate 2.

According to the tube partitioning method and the tube 1 formed by the same tube portioning method mentioned above, the partitioning plate 2 is bitten in the inside wall of the tube 1 0.1 mm or more inwardly from the periphery edge face. This can produce the probable result that the shrinking effect of the tube 1 produced by the crimping and the plastic deformation of at least one of the tube 1 and the partitioning plate 2 at the contact portion thereof produced by the crimping are fully cooperated in a synergistic manner, so that no substantial gap is formed between the partitioning plate 2 and the inside face of the tube 1 to bring the partitioning plate 2 and the inside face of the tube 1 with close contact with each other. This can produce improved air-tightness of the tube 1.

In addition, since this result can be produced by the crimping process only, there is no need of the seal member, such as an O-ring, differently from the prior art. Further, there is no need to take the process of mounting the seal member such as the O-ring and the process of pressing the tube 1 against the partitioning plate 2 strikingly from the surfacewise direction of the partitioning plate 2. This can provide the results that the improved airtight tube 1 can be provided with a decreased number of processes and at reduced costs.

The tube 1 may be in the form of a pipe which is opened at both ends thereof or closed at one end thereof. It is enough that the tube 1 has an opening that can allow the partitioning plate 2 to be inserted with its surface oriented substantially vertically with respect to the longitudinal direction of the tube 1.

In the partitioning method for partitioning the tube 1 into two or more airtight regions along the longitudinal direction thereof by using the partitioning plate 2, after the partitioning plate 2 is inserted in the tube 1 until the predetermined location along the longitudinal direction thereof, the tube 1 is subjected to the crimping process. In this method, the tube 1 is crimped at locations across the partitioning plate 2 so that it can be crimped onto the partitioning plate 2 at the locations adjacent to a predetermined location where the partitioning plate 2 is disposed. This can produce the probable result that the shrinking effect of the tube 1 produced by the crimping process and the plastically depressed deformation of the tube 1 at its contact portion with the partitioning plate 2 from outside of the tube 1 produced by the crimping process are fully cooperated in a synergistic manner, so that no substantial gap is formed between the partitioning plate 2 and the inside face of the tube 1. This can produce the improved airtight tube 1.

On the other hand, in the partitioning method for partitioning the end portion of the inside face of the tube 1 by using the partitioning plate 2, after the tube 1 is folded back by the bending process, first, and, then, the partitioning plate 2 is inserted in the tube 1 from the other end, the tube 1 is subjected to the crimping process. In this method, the tube 1 is plastically deformed at least either of the locations across the partitioning plate 2 and adjacent to a predetermined location where the partitioning plate 2 is disposed.

Preferably, the partitioning plate 2 is made of metal higher in hardness than and smaller in stretch than that of the tube 1. Preferably, the second process includes the process that after the partitioning plate 2 is fixed in the tube 1, the tube 1 is plastically deformed in a depressed manner from outside thereof so that its inside face is brought into close contact with the partitioning plate 2 at its thicknesswise face and at its front and back sides adjacent to the thicknesswise face. This can expectedly provide an even closer contact between the tube 1 and the partitioning plate 2, thus providing further improved air-tightness.

It should be noted here that the passage of "is made of metal higher in hardness than and smaller in stretch than that of the tube 1" is intended to include not only the concept that the tube 1 and the partitioning plate 2 are made of metals different from each other but also the concept that the both are made of metals of the same kind as varied in hardness and stretch from each other by the heat treatment process and the like. The use of the partitioning plate 2 made of metal higher in hardness and smaller stretch than that of the tube 1 for the partition can facilitate the depressed plastic deformation of the tube 1 to bring its inside face into close contact with the thicknesswise face of the partitioning plate 2 and at the front and back sides thereof adjacent to the thicknesswise face.

The method of crimping the tube 1 from outside of the tube 1 at the two spaced apart locations adjacent to the predetermined location where the partitioning plate 2 is disposed is effective for the partitioning method for partitioning the tube 1 into a plurality of regions along the longitudinal direction of the tube 1.

It is preferable that the partitioning plate has at least a first thickness portion and a second thickness portion which are symmetrical with respect to the centerline or axis of the cross-section taken from the thickness direction, the first thickness portion being larger in thickness than the second thickness portion, and the second thickness portion being equal in thickness to the peripheral edge face 2a of the partitioning plate 2. As to the terminology "the first thickness portion" and "the second thickness portion", when the peripheral edge face 2a of the partitioning plate 2 having substantially uniform thickness is reduced in thickness, the substantially uniform thickness portion is defined as the first thickness portion, and the reduced thickness portion of the peripheral edge face 2a is defined as the second thickness portion.

This method provides the result that a reaction force of the partitioning plate 2 to the inside face of the tube 1, which is generated when a force is applied in the crimping process, increases, as compared with the method using the partitioning plate 2 having substantially the uniform thickness. This produces increase in shrinkage of the tube 1 and in plastic deformation of the depressed portion of the tube 1 on the inside face side (or increase in contact between the inside face of the tube 1 and the partitioning plate 2), thus providing improved air-tightness of the tube 1.

Further, when the partitioning plate 2 is tapered from the first thickness portion to the second thickness portion, concentration of the stress on the partitioning plate 2 by the crimping process can be relieved and, accordingly, an increased crimping force can be provided to that extent. The plastic deformation of the depressed portion of the tube 1 on the inside face side is determined by various conditions including, for example, hardness of the tube 1 and the partitioning plate 2, thickness of the same, and so on. The tapered form of the partitioning plate 2 is useful when the inside face side of the tube 1 is resistant to plastic deformation and small in amount of plastic deformation at the depressed portion thereof.

In addition, since the thickness of the second thickness portion of the partitioning plate 2 is smaller than the cross-section thickness of the contact portion of the tube 1 with the partitioning plate 2, an increased amount of shrinkage of the tube 1 can be provided when the same crimping force is applied. As a result, an increased amount of plastic deformation of the depressed portion of the inside face of the tube 1 is provided and thus further improved air-tightness of the tube 1 is provided.

EXAMPLE OF EXPERIMENT

The tube 1 partitioned by the crimping process mentioned above was subjected to a helium leakage test in which an amount of leakage of not more than $1.0 \times 10^{-5}$ Pa·m$^3$/s was defined as an acceptable level. The results are shown in TABLE 1. The helium leakage test was conducted while varying the thickness of the partitioning plate 2 and the shape of the peripheral edge face 2a properly. A cold-finished seamless steel pipe having a tensile strength of 585-715 N/mm$^2$, a yield point of 540-670 N/mm$^2$, a stretch of 18-26% and a thickness of approximately 1.7 mm was used as an invariable condition for the tube 1, and SUS304 in disk form was used as an invariable condition for the partitioning plate 2.

TABLE 1

Helium Leakage Test Result

| Condition No. | Shape of End Portion of Seal Plate | Thickness of Seal Plate | Test Result | Value B |
|---|---|---|---|---|
| 1 | Straight | 2 mm | OK | — |
| 2 | Straight | 3 mm | NG | 0.084 mm |
| 3 | Tapered | 2 mm (Thickness of Peripheral Edge Face: 1 mm) | OK | — |
| 4 | Tapered | 3 mm (Thickness of Peripheral Edge Face: 2 mm) | OK | 0.137 mm |
| 5 | Tapered | 3 mm (Thickness of Peripheral Edge Face: 1 mm) | OK | 0.15 mm |
| 6 | Shouldered | 2 mm (Thickness of Peripheral Edge Face: 1 mm) | OK | — |
| 7 | Shouldered | 3 mm (Thickness of Peripheral Edge Face: 2 mm) | OK | — |
| 8 | Shouldered | 3 mm (Thickness of Peripheral Edge Face: 1 mm) | OK | — |

Figure 5A:
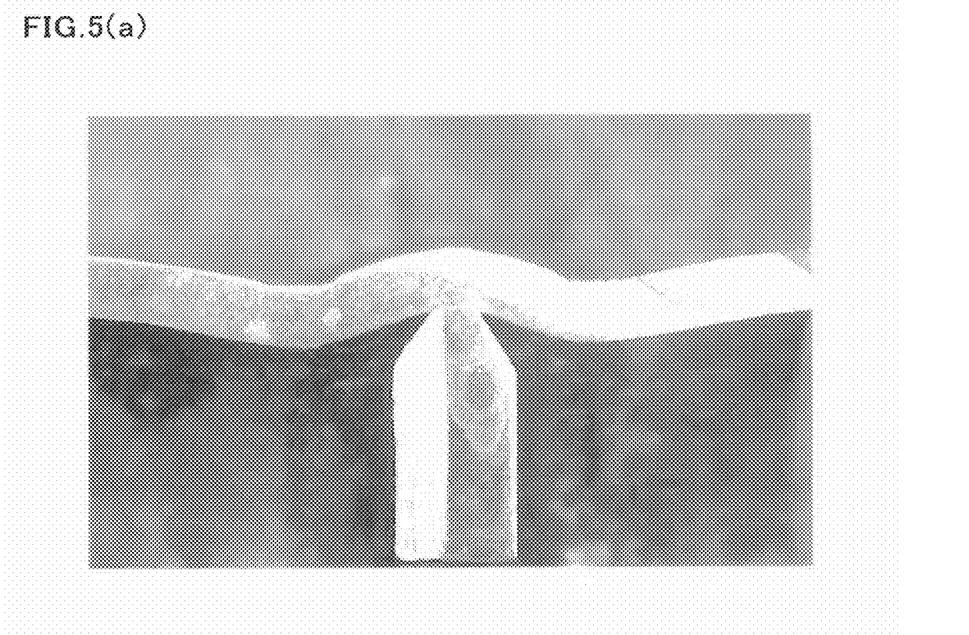
FIG. 5(a) is a photograph of a contact region of an inside face of the tube with the partitioning plate after subjected to the crimping process under the condition 5.
Figure 5B:
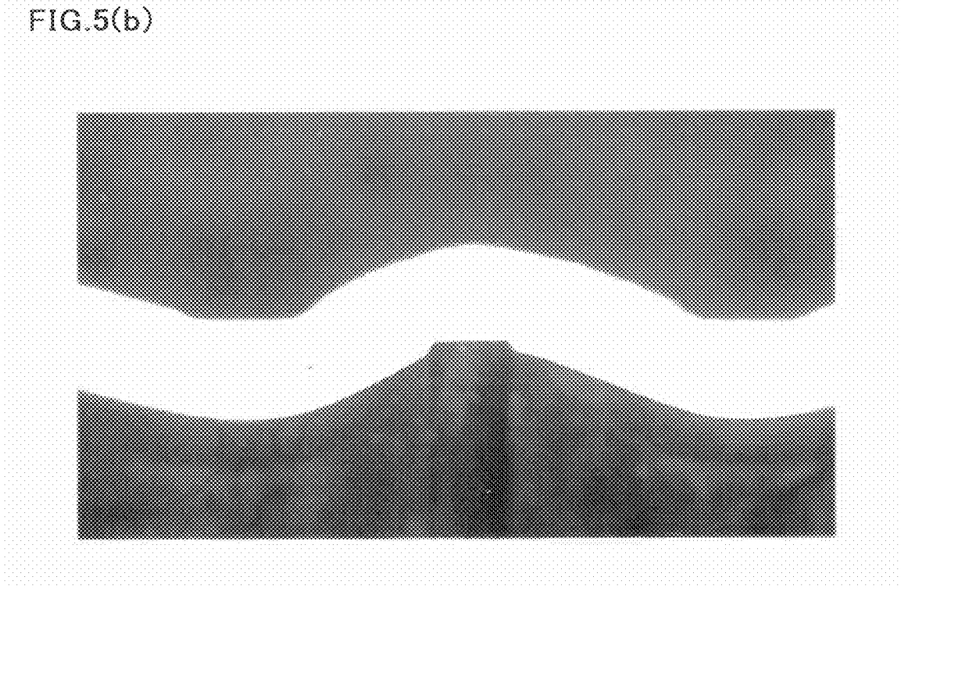
FIG. 5(b) is an enlarged view of FIG. 5(a)
Figure 6A:
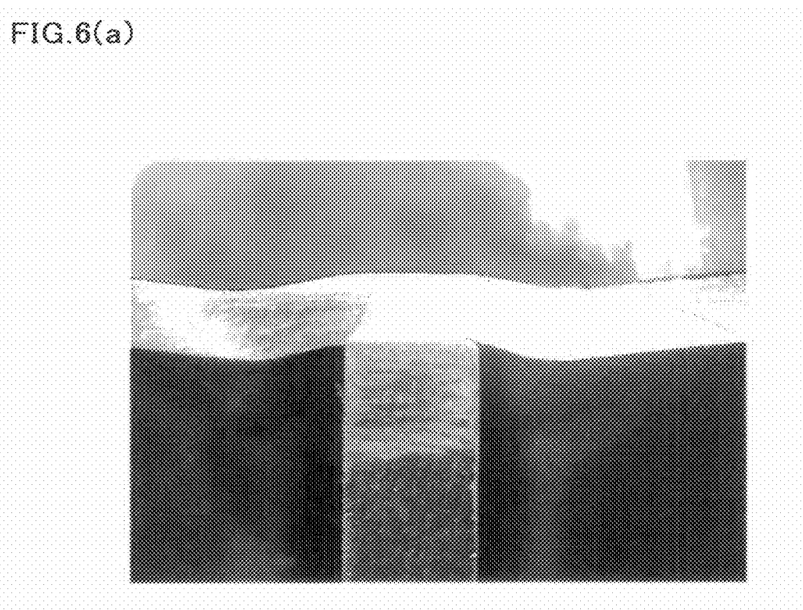
FIG. 6(a) is a photograph of the contact region of the inside face of the tube with the partitioning plate after subjected to the crimping process under the condition 2.
Figure 6B:
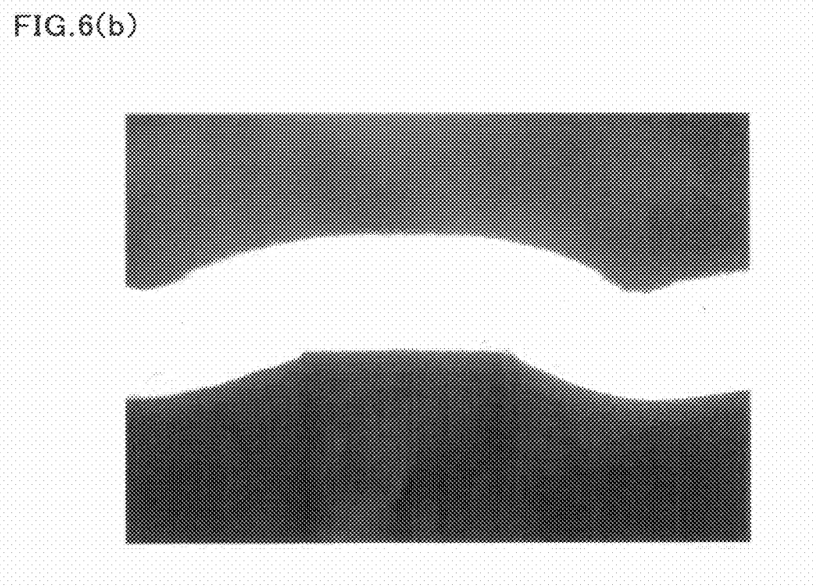
FIG. 6(b) is an enlarged view of FIG. 6(a)

In connection with the condition 5 in which the good result was obtained in the experiment and the condition 2 in which no good result was obtained in the experiment, photographs of the contact portion between the inside face of the tube 1 and the partitioning plate 2 after subjected to the crimping process are shown in FIGS. 5 and 6. FIG. 5(a) is the photograph taken when the crimping process was carried out in the condition 5, and FIG. 6(a) is the photograph taken when the crimping process was carried out in the condition 2. Macrophotographs of FIG. 5(a) and FIG. 6(a) are shown in FIG. 5(b) and FIG. 6(b), respectively.

In the condition 5, the inside face of the tube 1 was plastically deformed in a depressed manner, providing an increased degree of contact between the tube 1 and the partitioning plate 2, as observed from FIG. 5(a) and (b). It was observed, on the other hand, that in the condition 2, the amount of plastic deformation of the tube 1 was small, providing a low degree of contact therebetween. Though the photograph taken in the condition 4 is not shown, it was confirmed that an increased degree of contact was also provided in the condition 4, as is the case with the condition 5.

Figure 7:
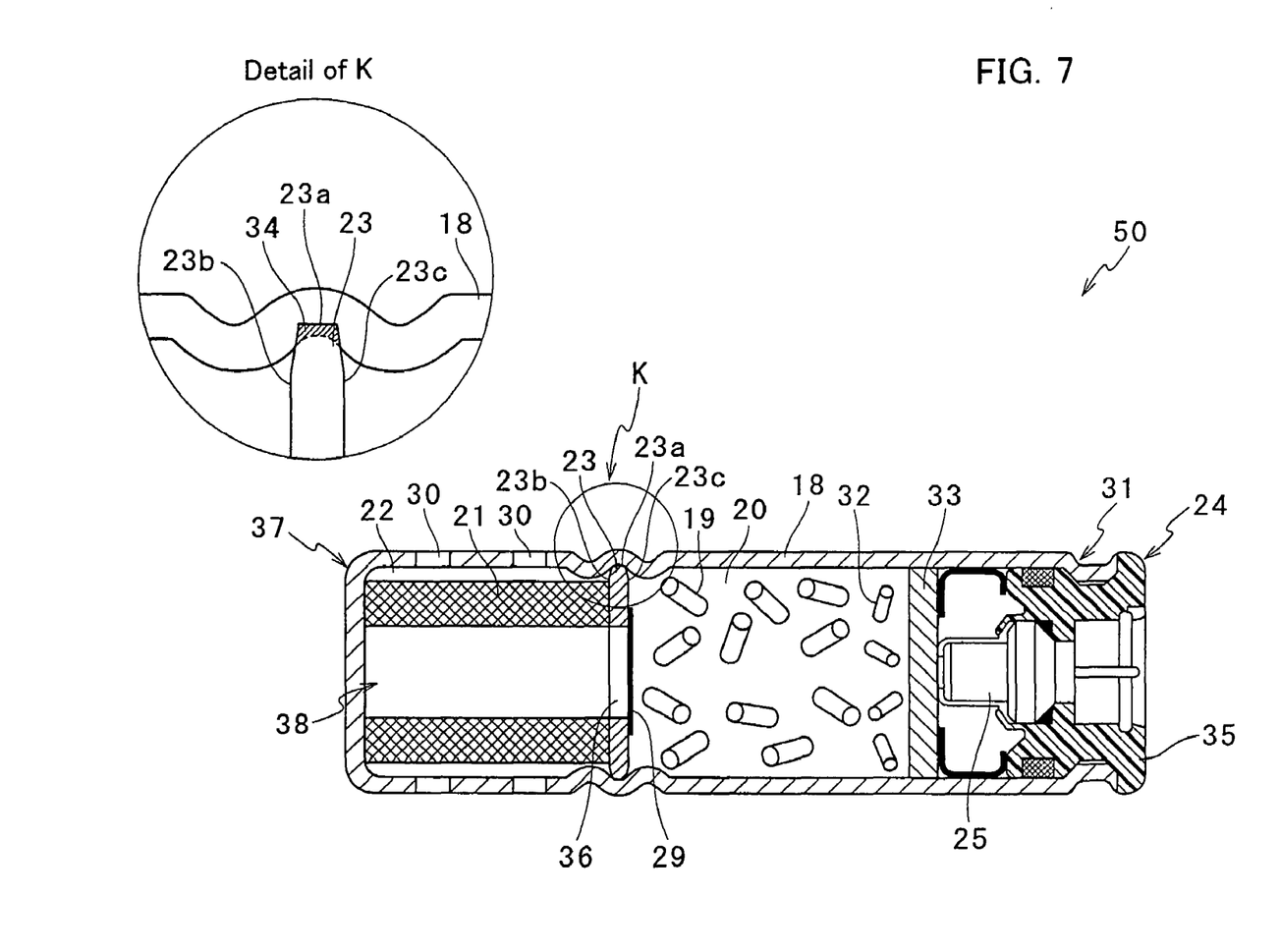
FIG. 7 is a gas generator used for an airbag for protecting a vehicle occupant from shock in a car collision.

Next, a gas generator used for an airbag which is an example of the embodiment in which the tube of the present invention is used is explained with reference to FIG. 7. FIG. 7 shows a gas generator 50 used for the airbag to protect a vehicle occupant from the shock in a car collision. In FIG. 7, the gas generator 50 has a cylindrical tube 18 made of metal, a partitioning plate 23, made of metal higher in hardness and smaller in stretch than that of the tube 18, for partitioning an interior of the tube 18 into a combustion chamber 20 packed with gas generant 19 which is to be burnt to generate high pressure gas and a filter chamber 22 in which a filter 21 is fitted, and an igniter device 25, mounted on an end portion 24 of the tube 18 on the combustion chamber side, for igniting and burning the gas generant 19 in the combustion chamber 20. The tube 18 has a cylindrical form that opens at an end 24 thereof on the combustion chamber side. Preferably, the tube 18 has a flat-bottomed form at an end 37 thereof on the filter chamber side.

A cold-finished seamless steel pipe having a tensile strength of e.g. 585-715 N/mm$^2$, a yield point of 540-670 N/mm$^2$, and a stretch of 18-26% is used for the tube 18, and SUS 304 is used for the partitioning plate 23. These metals are not limitative for the tube 18 and the portioning plate 23. This is because an amount of plastic deformation of a depressed portion formed in the inside face of the tube 18 is determined by various factors including hardness, thickness, and stretch of each of the tube 18 and the partitioning plate 23, a shape of the peripheral end portion of the partitioning plate 23, and a crimping force applied thereto.

As shown in FIG. 7, an orifice 36 is formed on an axis of the tube 18. The orifice 36 can allow communication between the combustion chamber 20 and the filter chamber 22 and is usually closed by a seal member 29, such as an aluminum tape, adhesively bonded to the partitioning plate 23. When collision signals are detected and then high temperature and high pressure gas is generated in the combustion chamber 20, the seal member 29 is burst by the generated gas to allow the gas to smoothly flow into the filter chamber 22.

The tube 18 has gas discharge holes 30 formed around the outside thereof at its end portion 37 on the filter chamber side. Preferably, the gas discharge holes 30 are arranged in two stages. The high temperature and high pressure gas generated by burning the gas generant 19 in the combustion chamber 20 flows from the gas discharge holes 30 into a space 38 of the filter chamber 22, passing through a filtering material 21 while being cooled down and filtered by the filtering material 21, and then is discharged into airbag not shown.

A holder 35 for holding an igniter 25 is fixed in the tube 18 at its end 24 on the combustion chamber side to close the tube 18 at its end 24 on the combustion chamber side. The holder 35 is fitted in the tube 18 at its end 24 on the combustion chamber side and is fixedly held by crimping an axial end portion 31 of the tube 18 onto the holder 35, to close the tube 18 at its end 24 on the combustion chamber side.

The filtering material 21, the gas generant 19, enhancer agent 32, cushioning material 33 are loaded in this order in the tube 18 from its end 37 on the filter chamber side. Thereafter, the holder 35 in which the igniter 25 is fixed is inserted in the tube 18 from its end 37 on the filter chamber side. The partitioning plate 23 is provided between the filter chamber 22 and the combustion chamber 20 to partition the tube into the both chambers.

The partitioning plate 23 has a thickness of 2.5 mm or less at a peripheral end face thereof. The tube 18 is partitioned by the partitioning method of the present invention using the partitioning plate 23. The tube 18 is crimped from its peripheral edge thereof at two locations adjacent to the location where the partitioning plate 23 is fitted, to hold a peripheral end portion of the radially projecting partitioning plate 23 in sandwich relation. The inside face of the tube 18 is plastically deformed to be closely contacted with a thicknesswise surface (peripheral edge face) 23a of the partitioning plate 23 and front and back sides 23b, 23c of the partitioning plate 23 of the gas generator. As a result, a depressed portion 34 is formed in the inside face of the tube 18, and the tube 18 and the partitioning plate 23 are put in close contact with each other in the depressed portion 34. An orifice 36 is formed in the portioning plate 23.

Thus, the tube 18 and the partitioning plate 23 are put in close contact with each other in the depressed portion 34 formed in the inside face of the tube 18 and thereby airtightness of the seal member 29 and the combustion chamber 20 is kept. This can prevent functional decline of the gas generant 19 packed in the combustion chamber 20 resulting from the moisture contained in the air. Further, the gas generator 50 thus subjected to the portioning process can prevent impairment of the close contact between the partitioning plate 23 and the tube 18 even at high pressure. This can provide the result that when a large amount of gas is generated in the combustion chamber 20 due to car collision, the generated gas can be prevented from bypassing the filter material 21 from a space between the partitioning plate 23 and the tube 18 before discharged into the airbag not shown.

In addition, when the tube 18 is crimped from its peripheral surface at the two locations adjacent to the location where the partitioning plate 23 is fitted, the partitioning plate 23 can be fixed in the tube 18 and also can be brought into close contact with the tube 18 at its depressed portion 34 produced by plastically deforming the tube 18. This can provide the airtight gas generator 50 with a decreased number of processes. Also, differently from the prior art, there is no need of the process of notching the peripheral edge of the partitioning plate 23 and fitting the seal material such as an O-ring in the notch thus formed. This can provide the airtight gas generator 50 at reduced costs.

The gas generator of the present invention is suitably applicable as a side protection use gas generator and a knee protection use gas generator.

Although the present invention has been illustrated above in the form of the preferred embodiments, the present invention is not exclusively limited thereto. It would be understood that various variants and modifications may be made without departing from the sprit and scope of the present invention.

BRIEF DESCRIPTION OF THE DRAWINGS

The patent or application file contains at least one drawing executed in color. Copies of this patent or patent application publication with color drawing(s) will be provided by the office upon request and payment of the necessary fee.

| | Explanations of letters and numerals |
|---|---|
| A | Depth of Indentation of Claw |
| B | Depth of Bite of Partitioning Plate into Tube |
| H | Predetermined Location |
| O₁ | Axis |
| O₂ | Axis |
| X | Thickness of Partitioning Plate |
| Y | Thickness of Notched Portion |
| Z | Insertion Depth in Tube |
| 1 | Tube |
| 2 | Partitioning Plate |
| 2a | Peripheral Edge Face |
| 2b | Front Side |
| 2c | Back Side |
| 3 | Depressed Portion Formed in Inside face of Tube |
| 4 | Crimping Apparatus |
| 5 | Claw Holding Portion |
| 6 | Mounting Base |
| 7 | Claw |
| 8 | Main Body |
| 9 | Arm |
| 10 | Hydraulic Cylinder |
| 11 | Tip Hardware |
| 12 | Fixing Pin |
| 13 | Hardware |
| 14 | Connecting pins |
| 15 | Switch |
| 16 | Main Body of Partitioning Plate |
| 17 | Corner of Peripheral Edge Face of Partitioning Plate |
| 18 | Tube |
| 19 | Gas Generant |
| 20 | Combustion Chamber |
| 21 | Filter material |
| 22 | Filter chamber |
| 23 | Partitioning Plate |
| 23a | Surface |
| 23b | Front Side |
| 23c | Back Side |
| 24 | End Face on Combustion Chamber Side |
| 25 | Igniter Device |
| 29 | Seal member |
| 30 | Gas Discharge Hole |
| 31 | Axial End Portion of Tube |
| 32 | Enhancer Agent |
| 33 | Cushioning Material |
| 34 | Depressed Portion |
| 35 | Holder |
| 36 | Orifice |
| 37 | End Portion on Filter Chamber Side |
| 38 | Space |
| 50 | Gas Generator |

The invention claimed is:

1. A gas generator for an airbag comprising:
an elongated cylindrical tube comprising metal, the tube including a first closed end and second end;
a partitioning plate which partitions an inside of the tube, in an axial direction, into
a combustion chamber packed with gas generant which is burnable to generate high pressure gas, and
a hollow cylindrical filter chamber fitted with a filter material;
an igniter, fitted at the second end of the tube, that ignites and burns the gas generant in the combustion chamber; and
a holder which closes the second end of the tube and holds the igniter,
wherein the partitioning plate comprises a metal higher in hardness than that of the tube,
wherein the tube includes a crimped portion on its peripheral face at locations adjacent to the partitioning plate,
wherein plastic deformation of the crimped portion creates, on the inside face of the tube, a depressed portion which reduces a plate thickness of the tube such that the partitioning plate bites 0.1 mm or more into a wall of the tube from a peripheral edge face of the partitioning plate,
wherein the partitioning plate has a first thickness portion and a second thickness portion, which is smaller in thickness than the first thickness portion and is a leading end of a portion that bites into the wall of the tube, and
wherein the partitioning plate is tapered from the first thickness portion to the second thickness portion, so that the thickness of the partitioning plate decreases toward the second thickness portion.

2. The gas generator for the airbag according to claim 1, wherein each of the first thickness portion and the second thickness portion is symmetrical with respect to a line passing through a center of the thickness of the partitioning plate.

3. The gas generator for the airbag according to claim 1, wherein the second thickness portion of the partitioning plate is thinner than a wall thickness of the tube where the tube contacts the partitioning plate.

4. The gas generator for the airbag according to claim 1, wherein the peripheral edge face of the partitioning plate has a thickness of 2.5 mm or less.

5. The gas generator for the airbag according to claim 1 further comprising, an orifice in the partitioning plate and that communicates with the hollow cylindrical filter chamber.

6. The gas generator for the airbag according to claim 5 further comprising, a seal member which is adhesively bonded to the partition plate to close the orifice and bursts when the gas generant is burned.

7. The gas generator for the airbag according to claim 1, wherein a gas discharge hole is disposed in a portion of the tube which corresponds to the filter chamber.

8. The gas generator for the airbag according to claim 7, wherein gas generated in the combustion chamber and passed through the filter material is discharged into the airbag through the discharge hole.

9. The gas generator for the airbag according to claim 1, wherein air-tightness between the tube and the partitioning plate is maintained only by contact between the respective metals thereof.

10. The gas generator for the airbag according to claim 1, wherein the partitioning plate includes a metal with a lower degree of elongation than that of the tube.

* * * * *